March 28, 1933. A. J. CORDREY 1,903,167
PRESSURE VESSEL FOR SOLID CARBON DIOXIDE
Filed March 12, 1931.
*Fig. 1.*
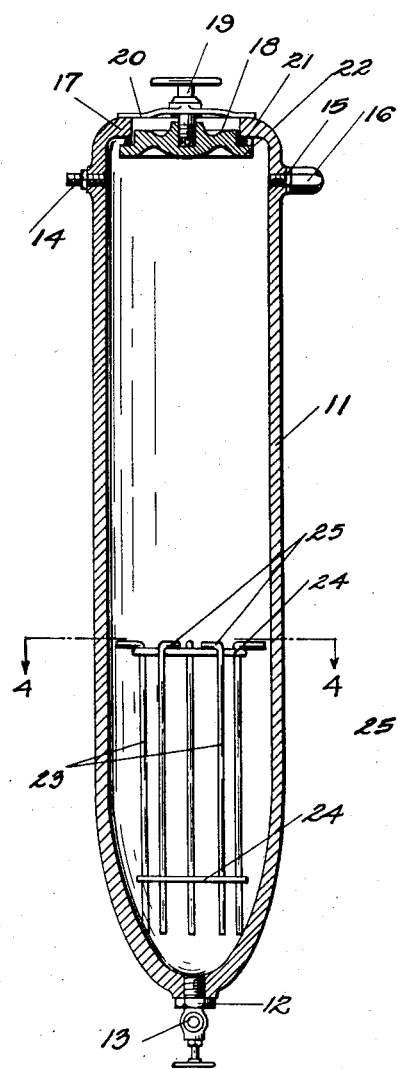
*Fig. 2.*
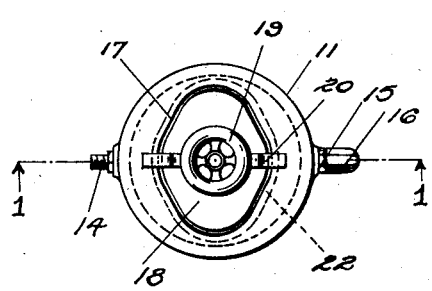
*Fig. 3.*
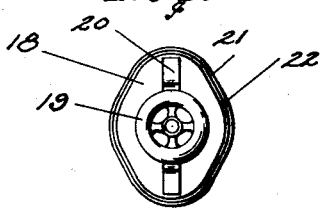
*Fig. 4.*
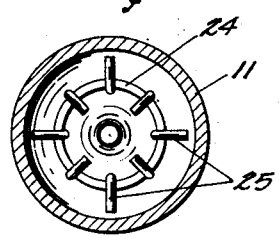
*Fig. 5.*
Inventor
Almon J. Cordrey
By Emery, Booth, Varney H Holcombe.
Attorney Patented Mar. 28, 1933

1,903,167

UNITED STATES PATENT OFFICE

ALMON J. CORDREY, OF DETROIT, MICHIGAN, ASSIGNOR TO ZERO ICE CORPORATION, A CORPORATION OF MICHIGAN

PRESSURE VESSEL FOR SOLID CARBON DIOXIDE

Application filed March 12, 1931. Serial No. 522,112.

This invention relates to apparatus for producing carbonic acid for miscellaneous use wherever desired in liquid or gaseous form, and contemplates liquefying carbon dioxide supplied in solid form and maintaining it under heavy pressure ready for use.

It is a well known fact that solid carbon dioxide, when exposed to atmospheric temperature and pressure, will sublimate or gasify, without passing through the liquid phase, but when the pressure is increased sufficiently, it will liquefy, the liquid occupying about fifty percent more volume than the equivalent weight in solid form, depending upon the density of the solid, i. e., the extent to which it has been compressed. Pressure vessels heretofore utilized for liquefying solid carbon dioxide have presented a source of danger from the possibility of overcharging them with the solid substance, giving rise to excessive pressure due to liquefaction of more carbon dioxide than the containers would hold.

My invention aims to provide a suitable pressure vessel for receiving and storing and liquefying solid carbon dioxide, and includes means to facilitate the charging of the solid carbon dioxide into the apparatus.

Further aims are to prevent overcharging of the apparatus, to enable it to be cleaned readily, and to prevent leakage of gas at the filling opening.

The invention comprises a seamless tubular body having one end tapered to conform to standard practice, and the other end provided with a suitable quick removable closure, and fitted interiorly with a rack for supporting the solid carbon dioxide prior to liquefaction.

Further details of the invention appear from the following description of the illustrative embodiment shown in the accompanying drawing, wherein Fig. 1 is an axial sectional view of a pressure vessel as fitted for use;

Fig. 2 is a top view of the same;

Fig. 3 is a plan view of the closure member, with the yoke turned to permit it to pass through the charging opening;

Fig. 4 is a cross-section on the line 4—4 in Fig. 1;

Fig. 5 is a perspective view of the supporting rack prior to its insertion in the pressure vessel.

In the form illustrated, the pressure vessel 11 has a seamless tubular body of steel or other tough strong metal or alloy, closed in at the lower end to a point, and provided with a threaded opening for an outlet fitting 12, which may be furnished with a valve 13 for drawing off the liquefied carbon dioxide as desired. Near the upper end of the pressure vessel are two threaded openings, one of which may be provided with an outlet fitting 14 for a pipe for drawing off carbon dioxide gas, and the other fitted with a similar outlet 15 for a gauge if desired. In case either is not needed for use, it may be closed by a plug or cap 16.

The top end of the pressure vessel is open to permit charging, and provided with a suitable closure. In the form of the invention illustrated, the upper end of the tubular body has an inwardly disposed flange 17 against which the closure member 18 is retained by means of a clamp bolt 19, and spring yoke 20. A gasket 21 is arranged between the edge portion 22 of the closure and the flange 17.

The closure opening and closure are preferably elliptical to permit the closure to be withdrawn when a charge is to be introduced, as may be quickly done by loosening it sufficiently to free the ends of the yoke 20, which may then be swung parallel with the longer axis of the opening (as shown in Fig. 3), and thereupon the closure may be tilted sidewise and turned endwise to pass between the sides of the opening. After the vessel has been charged, the closure may be inserted endwise through the opening, turned at right angles and swung parallel to the longer axis of the opening, the yoke turned to span the opening across its shorter sides and then clamped in place to draw the closure tight against the flange 17 and compress the gasket 21 to provide a gas tight seal.

A rack 23, preferably made of metal rings and L-shape bars of steel or wrought iron, or similar bendable but not easily breakable material, is provided for supporting the charge above the lower end of the pressure vessel at a point about a third way of the length of the body. The diameter of the ring members 24, to which the side bars are secured, is less than the smallest dimension of the top opening, to permit the rack to be placed in the pressure receptacle. The bent ends 25 of the L-shape bars are disposed radially and project over the upper ring member 24, and the outwardly bent ends may be heated and straightened sufficiently to pass through the opening, as illustrated in Fig. 5; and after the rack is in place these bent ends may be straightened while still hot, as illustrated in Fig. 1, whereby its removal thereafter is prevented. The rack prevents overcharging the pressure vessel with solid carbon dioxide, and thereby serves as a safeguard against the development of excessive pressure therein.

Pressure vessels embodying the invention may be located at the place of use, and periodically charged when exhausted of pressure, with solid carbon dioxide in safe amounts, no special precautions against overcharging being necessary. Such vessels may be readily flushed out and cleaned without removing the rack, and removal of the rack by careless or irresponsible persons is prevented. The compressed blocks of solid carbon dioxide are procurable commercially in sizes and weights convenient for charging such pressure vessels.

The invention is not restricted to the form, materials and construction of the several parts illustrated; but what I claim and desire to secure by Letters Patent is as follows:

1. A pressure vessel for liquefying solid carbon dioxide, comprising an elongated hollow body having an end charging opening of lesser size than the interior of the body, and a rack in said vessel of substantially greater length than width, the width of said rack being greater than the size of said opening whereby it cannot be removed from said pressure vessel without deformation.

2. A pressure vessel for liquefying solid carbon dioxide comprising an elongated hollow body having an end charging opening of lesser size than the interior of the body, and a rack in said vessel composed of lengthwise and radial bars and encircling rings, said rack being of substantially greater length than width, and length of said radial bars being greater than the diameter of said rings and securely welded thereto to provide projecting ends adapted to be bent when heated to permit said rack to pass through said charging opening.

3. A pressure vessel for liquefying solid carbon dioxide and the like comprising a body portion of tubular form, closed at one end and provided with an integral inwardly turned flange at the other end, a rack within said pressure vessel to support the solid carbon dioxide charge and prevent complete filling of said body therewith, a closure member having a seat portion adapted to engage against the inner face of said flange, and means carried by said closure member engaging the outer side of said flanged end for retaining said closure member in place.

4. A pressure vessel 11, provided with an end flange 17 defining a charging opening of non-circular shape, a closure 18 for said opening, and a rack 23 within said vessel having integral means 25 for preventing it from being withdrawn through said opening.

5. A pressure vessel for liquefying solid carbon dioxide, comprising an elongated hollow body having an end charging opening of lesser size than the interior of the body, and a rack in said vessel composed of lengthwise bars and encircling rings, said rack being of substantially greater length than width, and radially disposed bar-like members projecting outwardly from the upper one of said rings and securely fastened thereto to provide projecting ends constituting a support of greater diameter than said charging opening and adapted to be bent when heated to permit said rack to pass through said opening.

In testimony whereof, I have signed my name to this specification.

ALMON J. CORDREY.